Feb. 26, 1963
D. A. McLEAN
3,079,536
FILM-FORMING METAL CAPACITORS
Filed Sept. 21, 1959
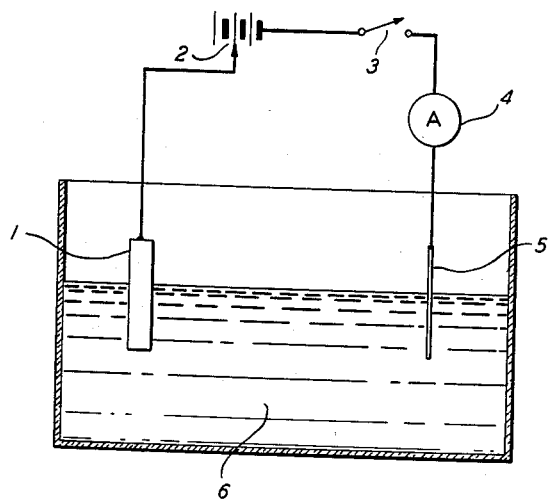
INVENTOR
D. A. McLEAN
BY
ATTORNEY

United States Patent Office
3,079,536
Patented Feb. 26, 1963

3,079,536
FILM-FORMING METAL CAPACITORS
David A. McLean, Chatham, N.J., assignor to Bell Telephone Laboratories, Incorporated, New York, N.Y., a corporation of New York
Filed Sept. 21, 1959, Ser. No. 841,337
9 Claims. (Cl. 317—230)

This invention relates to an improved method of fabricating capacitors which utilize a film-forming metal electrode, and to the capacitors so produced. Specifically, the improvement is manifested by an increase in the yield of capacitors having desirably low leakage currents.

There is a group of metals including tantalum, aluminum, niobium, hafnium and zirconium, termed film-forming metals whose oxides are known to be excellent dielectric materials well suited for capacitor use. An inherent advantage of the use of one of these oxides as the dielectric layer in a capacitor is the facility with which it may be produced. Thus, a tightly adherent, impervious, uniform oxide film may be produced on the surface of a body of a film-forming metal by conventional electrolytic anodization techniques. The insulated metal body is then employed as one electrode of the particular capacitor to be constructed.

Anodized electrodes of a film-forming metal are employed in the fabrication of three general types of capacitors. The wet electrolytic is the prototype of this group, and consists simply of an anodized electrode immersed in a suitable liquid electrolyte. The container which holds the anodized electrode and electrolyte is usually employed as the second electrode of the capacitor. Where the anodized electrode consists of a length of foil, the counter electrode and spacer are wound with the anode.

The second type of capacitor, developed after the wet electrolytic, is the solid electrolytic capacitor described in copending application Haring-Taylor Serial No. 346,416, filed April 2, 1953. This capacitor frequently takes the form of an anodized porous body which is coated successively with a layer of manganese dioxide and a layer of an electrically conductive metal, the latter serving as the second electrode. The manganese dioxide serves the purpose of the liquid electrolyte in the wet electrolytic, and facilitates the healing or rebuilding of discontinuities or irregularities in the dielectric oxide film.

The newest capacitor, referred to herein as the printed capacitor, is described in detail in copending application Serial No. 742,068, filed June 16, 1958, now Patent No. 2,993,266. This capacitor is constructed by depositing a layer of a film-forming metal on a substrate, for example, by sputtering or vacuum evaporation, anodizing the deposited layer to form an oxide film, and finally depositing a counter-electrode in direct contact with the anodized film.

The evolution of the printed capacitor was intimately bound up with problems directly affecting the dielectric oxide film. The wet electrolytic has the advantage of healing any imperfections in the dielectric film which are either present initially or which subsequently occur during the operation of the capacitor. However, this capacitor suffers from many disadvantages which are generally due to the fact that the capacitor employs a relatively large volume of liquid electrolyte. The solid electrolytic capacitor, by substituting a thin layer of manganese dioxide for the liquid electrolyte, is superior in many ways to the wet electrolytic type.

The printed capacitor represents the ultimate objective in the development of capacitors employing an electrode consisting of a film-forming metal. The manner in which the film-forming electrode is produced apparently minimizes the presence of defects or irregularities in the anodized dielectric film. Since electrolytes are employed in the other two types of capacitors solely to alleviate the undesirable effects caused by the imperfect dielectric film, the high quality dielectric of the printed type of capacitor obviates the need for any electrolyte medium. Accordingly, the simplicity and ease of fabrication of this type of capacitor renders it eminently well suited for use in printed circuits.

The present invention is directed to a method for improving the quality of the dielectric oxide layer of film-forming electrodes which are employed in the fabrication of capacitors. It has been determined that the undesirable irregularities and defects present in the anodized film are substantially eliminated by treatment in accordance with this invention. The net result of such treatment is a decrease in the level of leakage current and a consequent increase in the yield of capacitors meeting the required leakage current standards.

In accordance with the present invention, the anodized electrode is contacted with a non-aqueous electrolyte containing a relatively low concentration of one or more halide ions. The electrode is then positively biased for a short period of time during which negatively charged halogen ions, attracted to the anode, react with certain portions of the underlying film-forming metal electrode. Such reactions, which cause the film-forming metal to go into solution, occur only at imperfection sites of the anodized film. If the anodized film were perfect, in the sense of being free from irregularities and discontinuities, essentially no current would flow and essentially no reaction would occur at the electrode surface.

Following this etching step the film-forming electrode is again anodized in one of the conventional aqueous electrolytes to oxidize the portions of the electrode surface which were exposed by the etching procedure.

The inventive etching step may be introduced into the manufacturing process of the wet electrolytic, solid electrolytic and printed circuit capacitors, and in each case will result in an overall decrease in the leakage current of capacitors so produced. The invention is particularly valuable in the instance of the printed circuit capacitor since there is no provision in this structure for healing any defects or discontinuities which may be present in the dielectric oxide film.

The invention may be more easily understood by reference to the FIGURE which is a schematic drawing of an electrode being etched in accordance with the present invention.

With reference more particularly to the drawing, there is depicted anodized electrode 1, for example constructed of tantalum, connected to the positive side of variable direct-current power supply 2. Completing the electrical circuit are switch 3, ammeter 4, cathode 5, typically of platinum, and electrolyte 6, disposed as shown in the figure. Electrolyte 6 is a non-aqueous liquid containing a low concentration of one or more of the halogen ions.

The inventive etching step is initiated by closing switch 3 thereby biasing electrode 1 positively. If the dielectric oxide film covering anode 1 were perfect, essentially no current would flow through the circuit. However, any discontinuities or defects which may be present in the dielectric film serve as conducting paths for current flow. At such sites, the halogen ions react with the film-forming metal of which anode 1 is composed. The balance of the dielectric film and underlying metal electrode are unaffected by this treatment. The electrolytic etching action is continued for a short period of time and is interrupted by opening switch 3. The treated electrode is then reanodized in a conventional electrolyte to oxidize exposed surfaces of the electrode.

A detailed analysis of the effect of the inventive etching step on the film-forming electrode is necessary to appreciate the various ramifications of this process. The following discussion is directed specifically to the film-forming electrodes utilized in this printed capacitor. However, it is to be appreciated that the principles to be developed are applicable to all types of film-forming electrodes wherever employed.

It appears that the various defects or irregularities in the dielectric film, which manifest themselves as current-carrying centers during the inventive etching step, are voltage dependent. That is to say, the defects and irregularities do not break down and pass current until a certain potential is attained so that one group of defects may break down at relatively low voltages, a second group may break down at higher voltages and, a third group will not pass a current during the etching procedure until the potential at which the electrode was previously anodized is attained. Once breakdown occurs, an auto-catalytic effect obtains in that increased current flow results in a corresponding increase in reaction of halogen ions with the underlying electrode metal thereby increasing the exposed surface and permitting a larger current to flow. In view of this nature of the etching process, effective measures must be taken to prevent excessive erosion in the vicinity of the imperfection sites. This problem is most acute in the instance of the low breakdown voltage imperfection sites since these are the first to etch. If the erosion at these sites is permitted to continue in an uncontrolled fashion, substantially all of the current flow will be directed through these sites, thereby precluding any effectual treatment of the higher breakdown voltage sites of the electrode.

Two specific etching methods are suggested to alleviate the problems associated with the aforementioned differences in breakdown voltage of the imperfection sites. The first of these methods has the advantage of simplicity in that only one etching step is required. This method is conducted at a relatively high voltage and is predicated on the use of a low conductivity electrolyte. The voltage used in this etching procedure is generally of the order of the operating voltage or greater so that entire groups of imperfection sites, which have breakdown voltages equal to or less than the operating voltage, will be eroded during the process. Excessive attack at the low breakdown voltage sites is minimized by the use of the low conductivity electrolyte which tends to equalize the etching action by reason of its high electrical resistance.

The etching procedure consists of immersing an anodized electrode into a non-aqueous electrolyte containing halogen ions. The electrode is then biased anodically at a potential which is at least equal to the operating voltage of the capacitor and preferably at a potential of the order of twice the operating voltage. The etching is permitted to proceed for a time preferably of the order of one to four minutes. The etched electrode is then reanodized in a conventional electrolyte.

It is essential to maintain the etching current density at a value below 10 milliamperes per square centimeter, and preferably in the range of from one to three milliamperes per square centimeter. The current density is conveniently maintained within the proper limits by control of the concentration of halide ions in the electrolyte. It has been determined that the desired current densities may be achieved by use of an electrolyte having a specific resistivity in the range of from $1 \times 10^2$ to $1 \times 10^4$ ohm-centimeters. Treatment at current densities greater than the stated value tends to have an adverse effect upon the dielectric oxide film caused, in large measure, by the excessive heat generated at the imperfection sites.

The duration of the etching step is not a critical factor and the limits set forth above may be exceeded. However, longer etching times tend to increase the effective series resistance and decrease the capacitance, the loss of electrode material being responsible for both effects. The use of etching times below one minute tends to minimize the advantages gained by the inventive process.

The second of the two suggested procedures involves the use of a succession of etching steps, progressing upwards in voltage, with each step being followed by a conventional anodization treatment to heal portions of the electrode exposed in the preceding etching step. This method achieves the same results as the one described above, but in a different manner. By the use of a succession of etching steps the imperfection sites are treated group by group according to the voltage at which they break down. Thus, the first etching step may be conducted at a voltage equal to approximately 20 percent of the operating voltage for a period of the order of one to four minutes. This etching step produces erosion at those sites having breakdown voltages equal to or below 20 percent of the operating voltage. The anodizing procedure which follows this step produces a dielectric oxide coating over the eroded portions of the electrode so that these portions will pass no current in the succession of etching steps to follow. This process is then repeated until the desired maximum voltage is attained.

Since the low voltage imperfection sites are not exposed to excessively high etching potential in this procedure, the conductivity of the electrolyte is not a critical factor. However, the limits set forth above with respect to the etching current density apply in this instance also. Thus, the maximum etching current density is approximately 10 milliamperes per square centimeter, the preferred range being from one to three milliamperes per square centimeter. The current density in this procedure is conveniently controlled by proper choice of etching times and voltages.

Regardless of the particular technique used, a biasing voltage at least equal to the operating voltage should be attained during the etching step. In this manner imperfection sites which would otherwise break down during operation and cause a substantial increase in leakage current may be effectively treated. It is recommended that the biasing voltage be made equal to approximately twice the operating voltage for increased reliability.

The etching electrolyte suitable for use in the present invention may be composed of any non-aqueous solvent containing halide ions. The requirement that the electrolyte be non-aqueous is based on the necessity of maintaining the etching solution free of any ions which might be converted to form oxygen at the anode. The presence of such oxygen would promote the formation of the conventional dielectric oxide film and consequently interfere with the desired etching process. Thus, for example, methyl alcohol, ethyl alcohol, acetone, nitrobenzene, phenol, and aniline may be employed as the solvent, and salts such as aluminum chloride, lithium chloride, ammonium bromide, potassium fluoride, sodium iodide, and sodium fluoride are suitable sources of halide ions.

The advantages of the present invention are best appreciated by comparison of capacitors produced with and without the inventive etching step. Six capacitors were produced by the following procedure:

A layer of tantalum approximately 5000 angstroms in thickness was sputtered onto a glass substrate in a desired configuration. The tantalum film was then anodizde at a potential of 100 volts in an eletcrolyte consisting of 1 part oxalic acid, 2 parts water, and 3 parts ethylene glycol by weight. The electrolyte was maintained at 105° C. A counter electrode of gold was then deposited in contact with the anodized surface. The leakage currents of these capacitors, measured at 75 volts, are listed in Table I below.

TABLE I

Leakage Current (Amperes)

$3.0 \times 10^{-8}$
$2.2 \times 10^{-8}$
$3.2 \times 10^{-9}$
short
$9.8 \times 10^{-9}$
$> 10^{-6}$ A set of four capacitors, Examples 1 through 4, was produced in the following manner:

The procedure employed for the capacitors whose characteristics are shown in Table I was followed through the anodizing step. At this point in the procedure, each capacitor, after having been washed and dried, was immersed in an etching solution consisting of .01 percent by weight of ltihium chloride in methyl alcohol. The capacitor was then biased anodically at a potential of 90 volts, representing approximately 180 percent of the 50-volt operating voltage. The etching step was continued for a time in the range of from two to three minutes, the etching current density being equal to approximately 1 milliampere per square cenitmeter.

Following the etching step, the capacitor was washed and dried and then reanodized at a potential of 100 volts under the aforementioned conditions for a period of approximately 3 minutes. The leakage currents of capacitors so produced measured at 75 volts are listed in Table II.

TABLE II

Leakage Current (Amperes)

Example 1 _____ $2.3 \times 10^{-9}$
Example 2 _____ $2.4 \times 10^{-9}$
Example 3 _____ $2.8 \times 10^{-9}$
Example 4 _____ $3.0 \times 10^{-9}$ Two additional sets of four capacitors each, Examples 5 through 8 and 9 through 12, respectively, were produced in accordance with the method described above for Examples 1 through 4 except that Examples 5 through 8 were etched in a solution consisting of .05 percent ammonium bromide by weight in acetone, and Examples 9 through 12 were etched in an electrolyte consisting of .02 percent aluminum chloride by weight in methyl alcohol. Listed below in Table III are the leakage currents of these capacitors.

TABLE III

Leakage Current (Amperes)

Example 5 _____ $2.8 \times 10^{-9}$
Example 6 _____ $2.8 \times 10^{-9}$
Example 7 _____ $3.8 \times 10^{-9}$
Example 8 _____ $2.3 \times 10^{-9}$
Example 9 _____ $3.4 \times 10^{-9}$
Example 10 _____ $3.4 \times 10^{-9}$
Example 11 _____ $2.8 \times 10^{-9}$
Example 12 _____ $3.4 \times 10^{-9}$ Comparison of the leakage currents set forth in Tables II and III with those of Table I clearly indicate the advantages gained by the use of the inventive etching technique.

Listed below in Table IV are data illustrating the advantages of the present invention in the instance of the wet electrolytic and solid electrolytic capacitiors. The solid electrolytic capacitors embodied niobium anodes, and the wet electrolytics were constructed with sintered porous aluminum anodes. As noted, the use of an etched electrode resulted in a decrease in the leakage current in both types of capacitors.

TABLE IV

| | Solid Electrolytic | | Wet Electrolytic | |
|---|---|---|---|---|
| | Standard | Etched | Standard | Etched |
| Leakage Current (microamperes) | 40 | 10 | 20 | 5 |

It is to be understood that the examples set forth above are intended merely as illustrations of the practice of this invention. The inventive treatment may be practiced on electrodes composed of any of the film-forming metals and in the production of any type of capacitor. Furthermore, the principles of the etching technique disclosed above apply to any device which utilizes a dielectric oxide film produced on a film-forming metal electrode by anodization techniques. Variations may be made by one skilled in the art without departing from the spirit and scope of this invention.

What is claimed is:

1. The method of fabricating a capacitor which comprises the steps of producing a layer of a film-forming metal on a substrate by condensation, anodizing the said film-forming metal to form a dielectric oxide film thereover, immersing the anodized electrode in a non-aqueous electrolyte comprising ions of at least one halogen, biasing said anodized electrode anodically to cause an electric current flow between said first electrode and said electrolyte, reanodizing said first electrode, and disposing a second electrode such that said dielectric oxide film is interposed between said first and said second electrodes.

2. The method of claim 1 in which said first electrode comprises a layer of a film-forming metal deposited on a substrate, and in which said second electrode is in direct contact with the said dielectric oxide film.

3. The method of claim 1 in which said first electrode is a porous structure consisting essentially of a film-forming metal and in which a solid electrolyte is interposed between said dielectric oxide film and said second electrode.

4. The method of claim 1 in which a liquid electrolyte is interposed between said dielectric oxide film and said second electrode.

5. The method of claim 1 in which the said electric current flow is in the range of from 1 to 10 milliamperes per square centimeter of surface of the said first electrode.

6. The method of claim 1 in which the said electric current flow is in the range of from 1 to 3 milliamperes per square centimeter of surface of the said first electrode.

7. The method of claim 1 in which the specific resistivity of the said non-aqueous electrolyte is in the range of from $1 \times 10^2$ to $1 \times 10^4$ ohm-centimeters.

8. An electrolytic capacitor free of conductive paths between electrodes consisting essentially of, in succession, a substrate, an electrode consisting of a condensed layer of a film forming metal in intimate contact with said substrate, an anodized layer of the said film forming metal, and in intimate contact with said anodized layer a counter electrode consisting of a metal layer, and means for making electrical contact to each of the said electrode and counter electrode.

9. A capacitor according to claim 8 wherein said film forming metal is tantalum.

References Cited in the file of this patent

UNITED STATES PATENTS

| | | |
|---|---|---|
| 2,035,022 | Robinson et al. | Mar. 24, 1936 |
| 2,122,392 | Robinson et al. | June 28, 1938 |
| 2,267,717 | Brennan | Dec. 30, 1941 |
| 2,412,201 | Brennan | Dec. 10, 1946 |
| 2,607,825 | Eisler | Aug. 19, 1952 |
| 2,863,811 | Ruscetta | Dec. 9, 1958 |